Patented Mar. 20, 1945

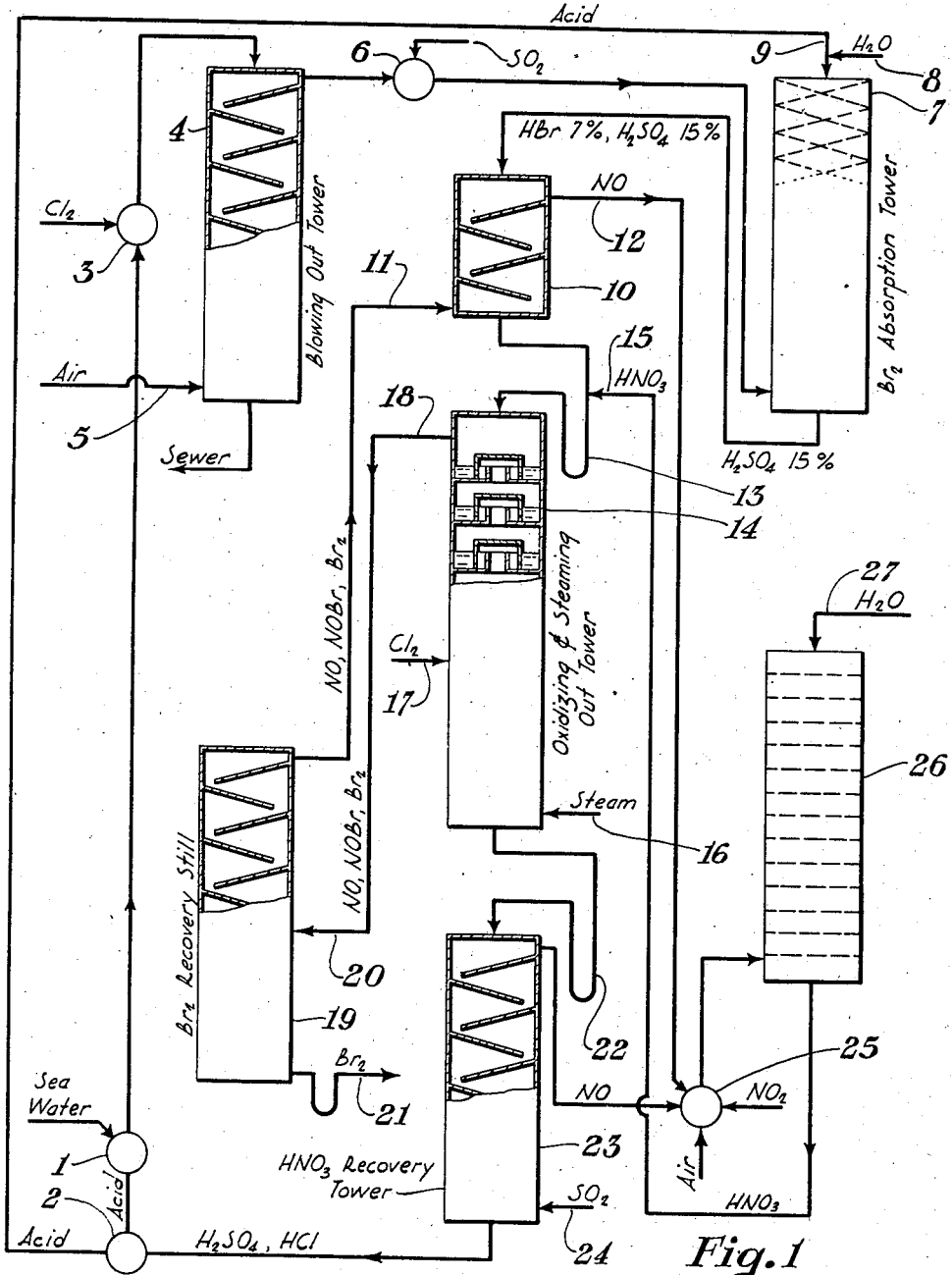

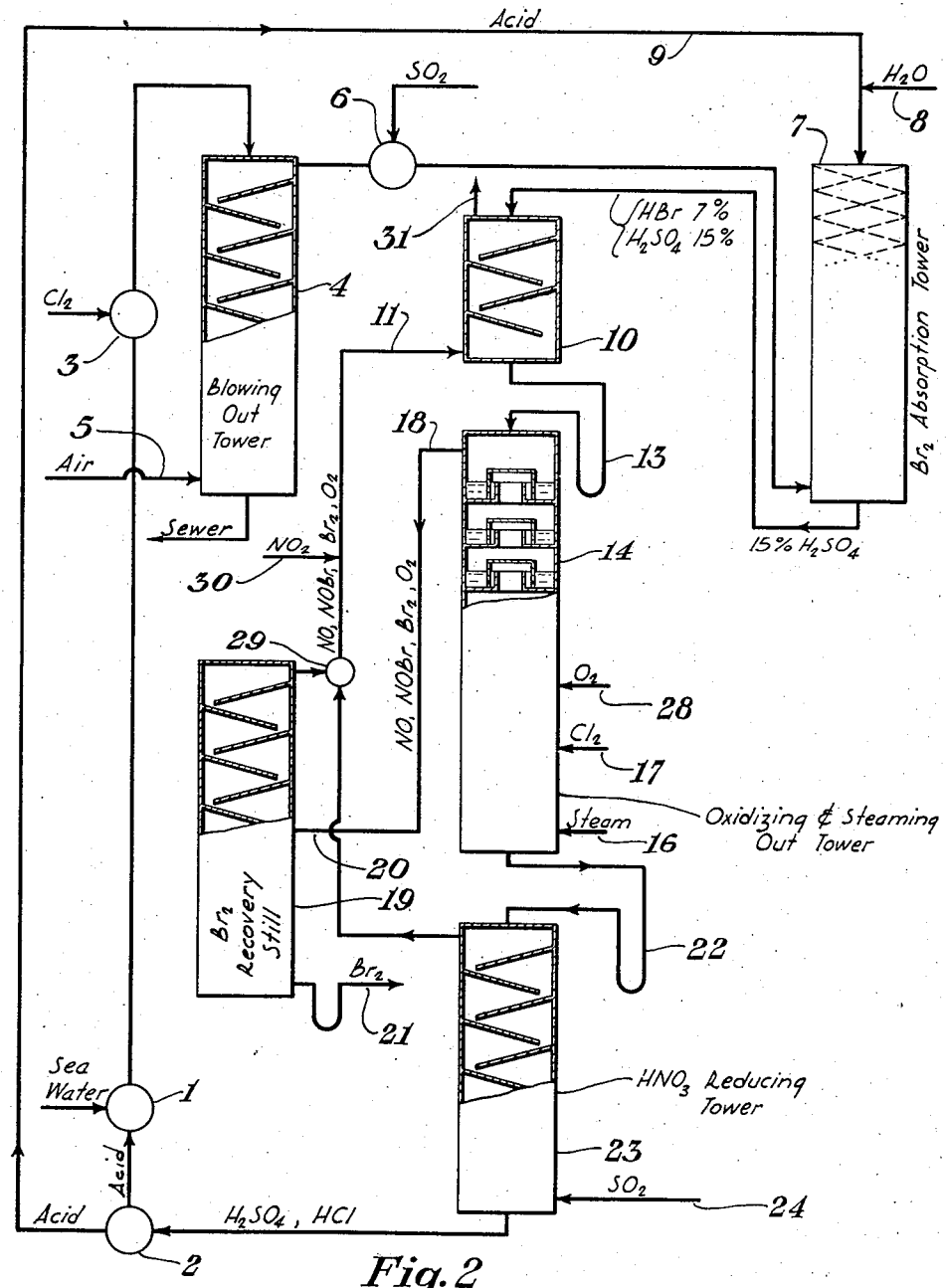

2,371,886

UNITED STATES PATENT OFFICE 2,371,886

BROMINE EXTRACTION

John J. Grebe, William C. Bauman, and Harold A. Robinson, Midland, Mich., assignors to The Dow Chemical Company, Midland, Mich., a corporation of Michigan Application June 4, 1942, Serial No. 445,706

5 Claims. (Cl. 23—217)

The invention relates to a method of extracting and recovering bromide or iodine in elemental form from solutions containing these halogens in combined form and is more particularly useful in connection with a process for the extraction and recovery of these elements from solutions containing the same as halogen acids, such as the recovery of bromine from hydrobromic acid obtained in one phase during the processing of sea water.

A method now having extensive commercial application for the extraction of bromine from sea water consists in acidifying the sea water and thereafter chlorinating the acidified solution to release the bromine in elemental form. The solution is then blown with air in a suitable tower whereby the bromine is carried off in the air stream. Since the bromine in the air stream is very dilute it is difficult in practice to absorb it directly and therefore recourse is had to a concentrating operation. This operation consists in passing the bromine laden air, sulfur dioxide, and water through a suitable tower under conditions such that chemical reaction occurs and an aqueous solution containing sulfuric acid and hydrobromic acid forms wherein the bromine occurs in combined form in a much higher concentration than in the original saline being processed. This solution is then chlorinated and the bromine steamed out after which the bromine is condensed directly. The process outlined above is disclosed in greater detail in U. S. Patent 2,143,224.

The foregoing process is highly satisfactory from a commercial standpoint providing a source of chlorine is available at reasonable cost. However, in some localities such is not the case and it becomes advisable to seek other means whereby the bromine may be liberated in elemental form without the use of chlorine as the oxidant in all phases of a process.

The principal object of the invention is, therefore, to provide a new method for the liberation and extraction of bromine from aqueous acid solutions of hydrogen bromide such as are obtained in some phases of the process when sea water is being treated for the recovery of bromine.

Another object is to provide a method for the extraction of bromine and iodine from solutions containing these elements as halogen acids.

Other objects and advantages will be apparent as the description of the invention proceeds.

We have found that bromine and iodine may be liberated from suitable concentrations of sulfuric acid containing these halogen acids by controlled reaction with nitric acid which is converted to nitric oxide by the reaction. At the same time the nitric oxide so formed can be reconverted into nitric acid for re-use by the direct action of air or oxygen and water so that in effect air or oxygen indirectly acts as the oxidizing agent to effect oxidation of the hydrobromic acid. The reactions forming the basis of the present improved process occur in accordance with the following equations which will be referred to hereinafter in the description at the stage of the process at which they occur.

(1) $3HBr + H_2SO_4 + HNO_3 \rightarrow Br_2 + NOBr + 2H_2O + H_2SO_4$
(2) $NOBr + H_2O \rightarrow HBr + HNO_2$
(3) $3HNO_2 \rightarrow HNO_3 + 2NO + H_2O$
(4) $4NO + 3O_2 + 2H_2O \rightarrow 4HNO_3$
(5) $2HNO_3 + 3SO_2 + 2H_2O \rightarrow 3H_2SO_4 + 2NO$ The invention then resides in the method hereinafter more fully described and particularly called for by the claims, reference being had to the accompanying drawings wherein Fig. 1 shows diagrammatically in flow sheet form one embodiment of the invention as applied to the extraction of bromine from sea water employing air in the reaction wherein the nitrogen oxides are converted into nitric acid.

Fig. 2 is a flow sheet sheet similar to that shown in Fig. 1 modified, however, in several steps due to the employment of oxygen in the reaction in which the nitrogen oxides are converted to nitric acid.

The invention will be described with reference to processing sea water wherein it is desirable for economic reasons to first free the bromine with chlorine and thereafter absorb the bromine from the air stream to form hydrobromic acid.

In the embodiment shown in Fig. 1 the sea water is acidified at 1 by acid drawn from source 2 and made during a later stage of the process in a manner to be described below. The acidified sea water is thereafter intimately contacted with chlorine at 3 in an amount sufficient to free the bromine. After the chlorination at 3 the brine is conducted to the top of blowing-out tower 4 where it is distributed over the packing in the tower and is met by an ascending stream of air introduced into the tower at 5. The air acts to blow out the bromine which is carried out of the tower 4 in the air stream. The air stream carrying the bromine is intimately contacted at 6 with sulfur dioxide and thereafter conducted into the bottom of a suitably packed tower 7 wherein it is contacted with water 8 introduced into the top of the tower 7. Chemical reaction occurs and the bromine is reduced to hydrobromic acid with the attendant formation of sulfuric acid, both of which dissolve in the water solution and flow out the bottom of tower 7. At the same time additional sulfuric acid 9 from source 2 is introduced into tower 7 along with the water, an amount being used such as will produce a sulfuric acid solution of 5 to 20 per cent and preferably about 15 per cent concentration. The acid solution containing the dissolved hydrobromic acid is maintained at a temperature of 25° C. or preferably slightly below this temperature and conducted to a small tower 10 wherein it meets an upwardly flowing stream of gas consisting of nitric oxide (NO), nitrosyl bromide (NOBr), and bromine (Br$_2$) introduced into the bottom of tower 10 at 11 and produced in a step of the process to be later described. The nitrosyl bromide in the gas mixture is decomposed by the action of the downwardly flowing acid solution into nitric oxide, nitric acid, and hydrobromic acid (see Equations 2 and 3). This hydrobromic acid along with the original hydrobromic acid and a small amount of free bromine in the gas mixture is dissolved in the downwardly flowing acid solution while the nitric oxide passes out of tower 10 at 12. The solution containing dissolved therein sulfuric acid, nitric acid, a small amount of bromine and hydrobromic acid is conducted through a suitably trapped pipe 13 to the top of tower or still 14, preferably of the bubble cap type. At the same time nitric acid is introduced into the still 14 and may be suitably added to the process through trapped pipe 13 at 15. The nitric acid acts in the still to oxidize nearly all the HBr and thus free the bromine in elemental form according to Equation 1. This reaction may take place at a temperature between about 50° and 110° C. The freed bromine is steamed out by introducing steam into the bottom of tower 14 at 16 in an amount to maintain the temperature of still 14 at 100° to 110° C., 105° C. being preferred. The amount of nitric acid added to tower still 14 is considerably above that theoretically necessary to oxidize the hydrobromic acid and liberate the bromine for a purpose to be explained below and is preferably in the neighborhood of from 300 to 350 per cent of the theoretical. At the same time complete oxidation is not obtained by use of nitric acid alone, it being in the neighborhood of only 90 per cent. Therefore a small amount of chlorine, roughly about 10 per cent of that theoretically necessary to completely oxidize the HBr, is added to still 14 at a convenient point such as about one third the way up the tower at 17. The chlorine acts as the clean-up oxidant and thus prevents loss of bromine in the effluent. The gases liberated in the oxidizing and steaming-out tower 14 escape from the tower at 18 and consist of a mixture of bromine, nitrosyl bromide, and nitric oxide, the latter being present due to the limited dissociation of nitrosyl bromide into nitric oxide and bromine vapor. The gas mixture is led into a continuous bromine recovery still 19 at a point 20 about the middle of the tower. The temperature of still 19 is controlled rather closely so that the temperature at the bottom of the tower is maintained at the boiling point of bromine (59° C.) The gases are thus refluxed in still 19 and a large portion of the bromine comes out at the bottom of the still through trapped pipe 21 where it may be collected and suitably packaged for commerce. The nitric oxide and nitrosyl bromide together with a small amount of bromine are carried out the top of still 19 and into tower 10 where the nitrosyl bromide is decomposed with the formation of nitric oxide, nitric acid, and hydrobromic acid, in accordance with Equations 2 and 3 combined. In addition, a small amount of hydrochloric acid is produced corresponding to the chlorine used in the oxidation. As heretofore explained the hydrobromic acid, bromine, and nitric acid are dissolved while the nitric oxide passes from tower 10 through line 12 and is utilized in a later step in the process as will be explained below. The solution flowing from the bottom of still 14 is led through a trapped pipe 22 to a small tower 23 and consists of a mixture of sulfuric acid and unreacted nitric acid together with a minor proportion of hydrochloric acid. The large excess of nitric acid over that theoretically necessary employed as mentioned above in the oxidation of the hydrobromic acid solution in tower 14 is now utilized for converting sulfur dioxide to sulfuric acid in accordance with Equation 5 so as to supply the necessary acid for the process. Thus an amount of sulfur dioxide is added at 24 such as will make up the necessary acid requirements for acidifying the brine and producing the necessary and desired concentration of acid in tower 7. At the same time the amount of nitric acid entering tower 23 through line 22 should of course be sufficient to convert all the sulfur dioxide to sulfuric acid. The acid mixture consisting mainly of sulfuric acid with a minor amount of hydrochloric acid is led from the bottom of tower 23 and is divided at 2, a portion being used to acidify the sea water at 1 while some of it is led to tower 7 to produce the proper acidity of the hydrobromic acid solution. It will be noted that the nitric acid entering tower 23 is converted to nitric oxide by the addition of sulfur dioxide to tower 23. This nitric oxide is combined with the nitric oxide issuing out of tower 10 through line 12 at 25. Air is also added at 25 together with a small additional amount of make-up nitrogen dioxide lost out of tower 23 so that the necessary amount of nitric acid will be produced for the oxidizing steps in towers 14 and 23 in accordance with the reactions illustrated by Equations 1 and 4. The mixture of nitric oxide, nitrogen dioxide, and air is led into the bottom of tower 26 while water is introduced at the top of the tower at 27. The amount of water is controlled so as to produce an acid of concentrated nature (about 60 per cent). The acid so formed is conducted to tower 14 and as previously mentioned is introduced into the tower through trapped line 15 where it effects oxidation of the hydrobromic acid, thus liberating the bromine.

In the modification shown in Fig. 2 wherein oxygen is employed in the conversion of the nitrogen oxides to nitric acid instead of air it will be noted that the process is exactly the same up to the point where the hydrobromic acid-sulfuric acid mixture is introduced into tower 10. When oxygen instead of air is employed it is preferably introduced into tower 14 at a point 28 above the point of introduction of the chlorine although it may be added at any point in or after tower 14 prior to leading the gases through line 18 to still 19. The majority of the bromine is separated out in still 19 as a condensate as described in connection with Fig. 1. The other gases are led out the top of still 19 and in this case consist of a mixture of nitric oxide, a small amount of bromine vapor, nitrosyl bromide, and oxygen. This mixture is combined with the nitrogen oxides issuing out of tower 23 at 29 resulting from the reduction of the nitric acid by the sulfur dioxide. To this mixture is added the desired amount of make-up nitrogen dioxide as at 30 and the mixture is led into tower 10 at 11. In this case the oxides are readily converted to nitric acid in tower 10 while waste gases are allowed to escape at vent 31 at the top of the tower. The nitric acid then flows into tower 14 from tower 10 through line 13. This process eliminates the necessity of employing a separate nitric acid tower 26 and gas mixing chamber 25 as is the case when air is employed as shown in Fig. 1. The modifications of Fig. 2 are possible because when oxygen is employed the nitrogen oxides can be converted in tower 10 without attendant loss due to the large volume of inerts necessarily present in case air is employed, which would act to carry off the bromine in the vent gas.

In the process described above an amount of sulfur dioxide is employed for reaction with nitric acid such as will furnish the entire acid requirements of the process. It will be understood, however, that the necessary amount of acid may be added directly as sulfuric acid, in which case it is unnecessary to employ such a large excess of nitric acid in order to have enough nitric acid available for conversion of sulfur dioxide to sulfuric acid to meet the acid requirements of the process. Actually in the case of bromine it is only necessary that the ratio of nitric acid to bromine, based on the weight of each, be above about 0.26 in order that the oxidation be efficiently effected. Thus in case acid is added directly it is only necessary to employ slightly more nitric acid than is theoretically necessary, e. g. 130 per cent of theoretical. If the acid is added directly without recourse to converting sulfur dioxide to sulfuric acid the excess nitric acid may be combined with the other acid values for acidification purposes or, preferably, only enough sulfur dioxide will be employed to convert the excess nitric acid to nitric oxide.

Although the method has been described with particular reference to the sea water-bromine process wherein sulfur dioxide is employed to convert the bromine in the blowing out air stream to hydrobromic acid, it will be understood that the method is applicable to processing any hydrobromic acid solution of suitable concentration. It is desirable that the hydrobromic acid concentration be from about 5 per cent up to very concentrated solutions in order that the nitric acid will act to effectively oxidize the solution and free a major proportion of the bromine. In employing the method in connection with the sea water-bromine process outlined above wherein the concentration of the hydrobromic acid produced in one step of the process averages about 7 per cent it has been found that the nitric acid oxidizes about 90 per cent of the bromine. The remainder is readily converted by the theoretical amount of chlorine. Thus in those instances where chlorine is not readily available or must be shipped in from considerable distances a notable saving in the chlorine requirements is effected and hence the economy of the process markedly improved. By the foregoing method the nitric acid acts to oxidize the hydrobromic acid and convert an amount of sulfur dioxide to sulfuric acid such as will meet the entire acid requirement of the process. At the same time the nitrogen oxides formed by the action of the nitric acid on the sulfur dioxide and the hydrobromic acid are readily reconverted to nitric acid by the action of air or oxygen and water so that it is unnecessary to continually renew the oxidizing agent.

Since it is necessary to add acid to the process in any case the sulfur dioxide which is reacted with the nitric acid furnishes an exceedingly cheap source of acid and it is only necessary to add slight amounts of nitrogen oxides to the process as these are lost due to inefficient reconversion. Thus air or oxygen acts indirectly as the oxidizing agent and is the only oxidizing agent that must be added in quantity once the hydrobromic acid is obtained. It will be readily appreciated that marked economy is effected by employing air or oxygen as an oxidizing agent in such a manner that the principal oxidizing agent is regenerated and continuously recycled.

The invention is similarly applicable to the extraction of iodine from salines containing the same in combined form or to the processing of various solutions of hydriodic acid, it being necessary to modify the process only slightly in view of the properties of the iodine. In the case of iodine recovery the hydriodic acid-sulfuric acid solution produced by adding sulfur dioxide to the iodine-containing air stream is contacted in the steaming-out and oxidizing tower with nitric acid. The separation of the liberated iodine and oxides of nitrogen may be brought about by collecting them in a suitable tower maintained at a temperature slightly above the melting point of the iodine whereby the iodine may be drawn off from a liquid layer separating at the bottom of the tower while the oxides of nitrogen are suitably collected as they issue out of the top of the tower.

We claim:
1. In a method of recovering bromine in elemental form from hydrobromic acid solutions containing the same, the steps which consist in adding thereto sulfuric acid in amount such that the resulting concentration of sulfuric acid in the solution is between about 5 and 20 per cent by weight, causing said solution to intimately contact nitric acid present in an amount such that the ratio of nitric acid to bromine, calculated as elemental bromine, is above about 0.26, adding chlorine to complete the liberation of the bromine, heating the solution obtained to a temperature sufficient to vaporize the liberated bromine and thereafter collecting and condensing the vaporized bromine.

2. In a method of recovering bromine in elemental form from solutions of hydrobromic acid, the steps which consist in adding sulfuric acid to the solution in an amount such that the concentration of sulfuric acid in the solution is between about 5 to 20 per cent by weight, bringing nitric acid into intimate contact with said solution in an amount above about 300 per cent of that theoretically necessary to liberate the bromine as elemental bromine with the formation of nitrosyl bromide while maintaining the temperature between about 50° to 105° C., adding chlorine to complete the oxidation of the hydrobromic acid into bromine, steaming out the bromine, separating the bromine from the nitrosyl bromide by condensing said bromine, collecting the excess nitric acid and reacting it with sulfur dioxide whereby nitric oxide is formed for conversion into nitric acid and the sulfur dioxide is converted into sulfuric acid for use in acidifying operations in the process, collecting the nitrosyl bromide and converting the same into nitric acid by reacting it with air and water, and returning the nitric acid so formed to the oxidizing steps of the process.

3. In a method of recovering bromine in elemental form from sea water, the steps which comprise acidifying said sea water, chlorinating the acidified sea water to liberate the bromine, blowing out the liberated bromine with air, adding sulfur dioxide and water whereby the bromine is converted to hydrobromic acid and absorbed in the water, adding sulfuric acid to bring the acid concentration to between about 5 to 20 per cent by weight, oxidizing nearly all the hydrobromic acid in said solution to produce nitrosyl bromide and bromine by bringing nitric acid into intimate contact with said solution in an amount such that an excess of nitric acid is employed over that theoretically necessary to oxidize the hydrobromic acid, the amount of excess being such that when later reacted with sulfur dioxide an amount of sulfuric acid will be formed which will meet the acid requirements of acidifying the sea water and bringing the hydrobromic acid solution to the desired sulfuric acid concentration, adding chlorine to complete the liberation of the bromine from the hydrobromic acid solution, steaming out the bromine as a vapor in admixture with the nitrogen oxides formed in the oxidation step, separating the bromine from the nitrogen oxides by condensing the bromine, collecting the aforementioned excess nitric acid and reacting it with sulfur dioxide so as to produce sulfuric acid and nitric oxide, collecting the nitrogen oxides formed in the process and reconverting said oxides to nitric acid by reaction with air and water, and returning the nitric acid so formed to the oxidizing steps of the process.

4. In a method of recovering bromine in elemental form from solutions of hydrobromic acid, the steps which consist in: adding sulfuric acid to the solution in an amount such that the concentration of sulfuric acid in the solution is between about 5 to 20 per cent by weight; bringing nitric acid into intimate contact with said solution in an amount such that the ratio by weight of nitric acid to bromine, calculated as elemental bromine, is above about 0.26 while maintaining the temperature of solutions between 50°–105° C. so as to oxidize nearly all the hydrobromic acid into bromine and nitrosyl bromide; adding chlorine to complete the oxidation of the hydrobromic acid into bromine, the bromine formed in the oxidation step being vaporized in admixture with the nitrosyl bromide; separating the bromine from the vapor mixture by condensation; collecting any excess nitric acid from the oxidation step and reacting it with sulfur dioxide whereby nitric oxide and sulfuric acid are formed; and converting the nitrosyl bromide and the nitric oxide into nitric acid for reuse in the oxidation step.

5. In a method of recovering bromine in elemental form from an aqueous hydrobromic acid solution, the steps which consist in: adding sulfuric acid to the solution in an amount such that the resulting solution contains between about 5 to 20 per cent by weight; contacting the resulting solution with the mixture formed in the later step of the method of nitrosyl bromide, oxygen, and nitric oxide so as to bring about the presence of nitric acid in the aforesaid resulting solution for oxidizing the hydrobromic acid therein to bromine, said nitric being formed by the interaction of the nitrosyl bromide, oxygen, and water; treating the mixture thus obtained with steam, chlorine, and oxygen, the steam raising the temperature of the mixture to between about 50° and 105° C., thereby to induce the nitric acid to oxidize nearly all the hydrobromic acid to bromine and nitrosyl bromide, the chlorine completing the oxidation of the hydrobromic acid, the oxygen being added in an amount sufficient for the nitric acid to be formed in the second step, and the temperature being sufficient to vaporize the bromine in admixture with the nitrosyl bromide and oxygen; separating the mixed vapors thus produced from the resulting aqueous nitric acid solution; separating the bromine from the mixed vapors by condensation; treating the aqueous nitric acid solution with sulfur dioxide so as to convert the nitric acid to sulfuric acid and nitric oxide; adding the nitric oxide thus obtained to the mixture containing the nitrosyl bromide and oxygen separated from the bromine in the condensation step; delivering the resulting gaseous mixture to the second step; and delivering at least a portion of the sulfuric acid produced from the nitric acid to the first step.

JOHN J. GREBE.
WILLIAM C. BAUMAN.
HAROLD A. ROBINSON.